Figure 1:
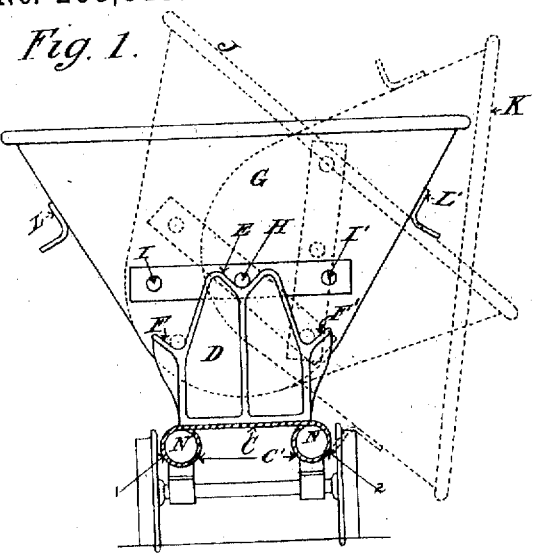

(No Model.)

R. HUDSON.
DUMPING WAGON.

No. 288,813. Patented Nov. 20, 1883.

2 Sheets—Sheet 1.

Attest:
F. W. Howard
J. H. Blackwood

Inventor;
Robert Hudson
by H. R. Doolittle
Attorney

N. PETERS, Photo-Lithographer, Washington, D. C.

(No Model.) 2 Sheets—Sheet 2.

R. HUDSON.
DUMPING WAGON.

No. 288,813. Patented Nov. 20, 1883.

Attest;
F. W. Howard
J. H. Blackwood

Inventor;
Robert Hudson
by J. M. Doolittle
Attorney

United States Patent Office.

ROBERT HUDSON, OF GILDERSOME, COUNTY OF YORK, ENGLAND.

DUMPING-WAGON.

SPECIFICATION forming part of Letters Patent No. 288,813, dated November 20, 1883.

Application filed March 3, 1883. (No model.) Patented in England November 3, 1882, No. 5,246.

*To all whom it may concern:*

Be it known that I, ROBERT HUDSON, a subject of the Queen of Great Britain and Ireland, residing at Gildersome, in the county of York, Kingdom of Great Britain and Ireland, have invented new and useful Improvements in Metallic and other Wagons, (for which I have obtained a patent in Great Britain, No. 5,246, bearing date November 3, 1882,) of which the following is a specification.

My invention relates to improvements in metallic and other wagons in which side tipping is an essential feature.

In constructing a tipping wagon or other vehicle according to my invention, capable of being tipped on either side with ease and safety, I fix at each end of the under frame-work a suitable pedestal or standard, of metal or wood, or a combination thereof, and I provide it with three fork-like openings or recesses. Between these standards is mounted the body of the wagon or other vehicle, which can be locked therein in the vertical attitude by suitable mechanism provided for the purpose. At each end of the said wagon-body I fix three studs or trunnions, either in a straight line or otherwise, so that when the body of the wagon or vehicle is in its normal position the axes of the three studs or trunnions may be either in a common horizontal plane or be so placed that the outside studs or trunnions are respectively in a plane deviating from the center said horizontal plane in relation to the center one. The center one at each ends rests in the middle fork-like recess of the corresponding standards. In this position the wagon or vehicle is ready for the reception of material intended to be conveyed therein. When it is desired that tipping shall take place, I first release from the locking mechanism above referred to the loaded body of the wagon or vehicle, which, being nearly in equilibrium, and free to partly rotate on the aforesaid center trunnions, is easily tilted over until the two trunnions at that side toward which the body is tilted—that is, one at each end of the wagon or vehicle—take into the corresponding outside recesses in the respective standards. The two last-named trunnions now become the center of the tilting motion. The said body, having become in its tilting motion somewhat accelerated by the time it has reached this position, continues to turn on said last-named trunnions until it is in a position for discharging its contents beyond the track either of the "rails" or "road" upon which the wagon or vehicle for the time may be standing; and in order that the two trunnions last referred to may be locked in their respective recesses or bearings in the standards, I use suitable stop-pieces, which I attach to the sides of the body of the wagon or vehicle, while at the same time the body is perfectly at liberty to be moved back to its normal position. It will be found convenient, in order to facilitate the loading of a wagon or vehicle up to a certain point, or unloading it from or into carts, drays, or other vehicles, to gently turn the body into the "half-tip" position, and on being partly loaded, and being nearly on the balance when in that position, it may be easily turned to its vertical position for completing the loading thereof, or, if desired, may be turned contrariwise, and discharge any remaining portion of its contents on the side of the track. I arrange the bodies of wagons or other vehicles, whether of wood or metal, or a combination thereof, so that the metallic parts of such bodies, or metallic parts attached thereto, forming portions of the under frame-work thereof, may form tubes or receptacles or attachments for buffers, (in cases where buffers are required.) When elastic buffers of india-rubber or metal are used, they are inserted within the tubes or receptacles. When wooden buffers are used, the tubes or receptacles embrace and are securely fixed to the same, thus rendering such wooden buffers less liable to be split up by the continued butting action of the wagons against each other during transit, or by the action of hot climates thereon.

In the accompanying two sheets of drawings like parts are marked with the same letters in the several views wherein such parts appear.

Figure 3:
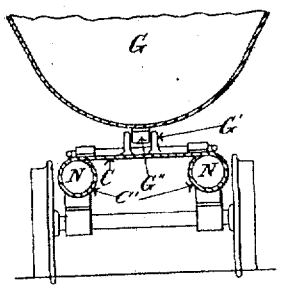
Figure 4:
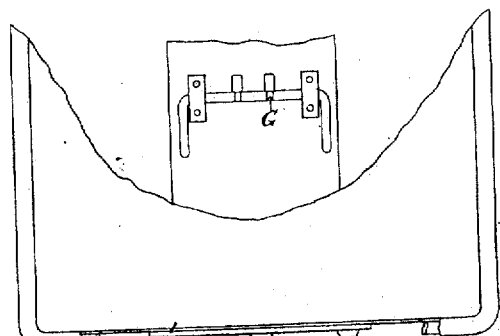
Figure 2:
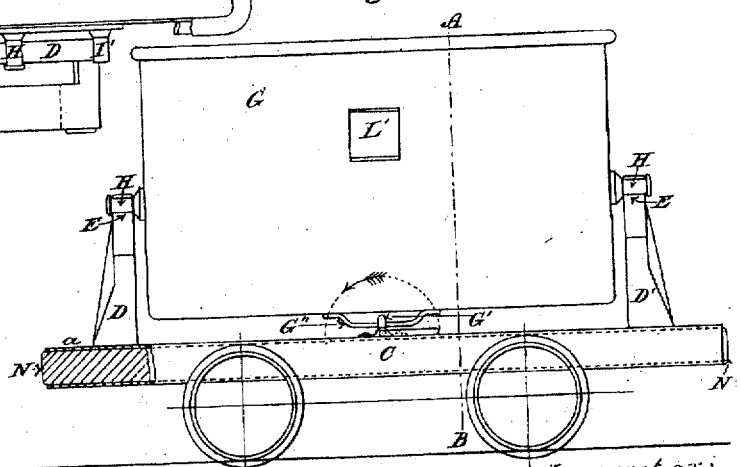

Figure 1, Sheet 1, is an end elevation of a tipping-wagon according to my invention. Fig. 2 is a side elevation. Fig. 3 is a part view in transverse vertical section on the line A B, Fig. 2. Fig. 4 is a partial plan, in which is shown the latch G', for locking the body in the vertical position.

Figure 10:
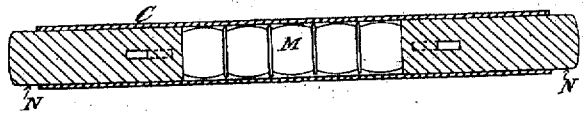

The bottom C is composed of a metallic plate or plates, so arranged as to form tubular sills of the under frame-work. Such tubular sills form receptacles for buffers, as hereinabove referred to, and as shown in longitudinal section in detail, Fig. 10, Sheet 2.

Figure 11:
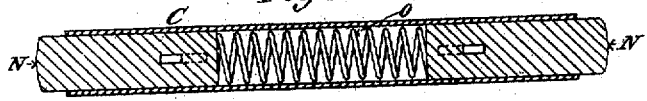

M are india-rubber springs acting on the buffers N N, of wood or metal, or a combination thereof. Fig. 11, being also a longitudinal sectional detail, shows a metallic spring, O, acting on the buffers N N in a similar manner as above described with reference to Fig. 10. Figs. 1 to 9, inclusive, show buffers entirely of wood, embraced and fixed within the tubular part of the under frame-work, C, one of which is partly in section at a, Fig. 2.

Upon the plate or plates C, Figs. 1 and 2, Sheet 1, are fixed the standards D D', each having three fork-like openings, recesses, or bearings, E, F, and F'.

G is the body of the wagon, which may either be of wood or metal, or a combination thereof. H I I' are three studs or trunnions, a set being fixed to each end of the body G. The central trunnions, H H, rest in the central fork-like openings, recesses, or bearings, E E, when the body is in a vertical attitude, (loaded or not,) as shown in full lines, Fig. 1, and the body is locked in that position by some suitable locking arrangement, such as the latch G', embracing the projecting part G² on the under side of body G, the said latch G' being turned over in the direction of the arrow in Fig. 2 when the body is required to be released for tipping. Dotted lines J indicate the body in the half-tipped position, as it would appear with the trunnions I' or I resting in the fork-like openings or bearings F' or F, according to the side on which tipping is to take place. The said trunnions I' or I, as the case may be, now constitute the center of motion for the remaining portion of the tipping movement, (represented by the dotted lines K.)

L L are the stop-pieces, previously referred to, attached to the sides of the body G. These, when the body is completely tipped, take a bearing against the respective sills at 1 and 2, Fig. 1, according to the side on which the body is tipped, and effectually lock the said trunnions I' and I in the fork-like openings, recesses, or bearings F' or F, as the case may be, and prevent the body from falling over. When the contents are discharged, the body may be easily turned back to its normal position, and locked therein, as before, for reloading. In the transverse vertical section, Fig. 3, the latch G' is clearly shown embracing the part G², thus locking the body in its normal position.

It will be obvious that the object of my invention, so far as tilting is concerned, might be attained by fitting studs or trunnions to the standards, and providing at the ends of the body of the wagon or vehicle three recesses for taking and turning thereon.

Figure 5:
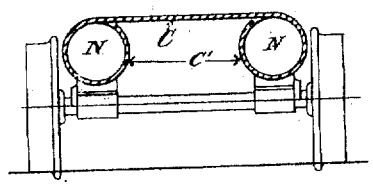
Figure 6:
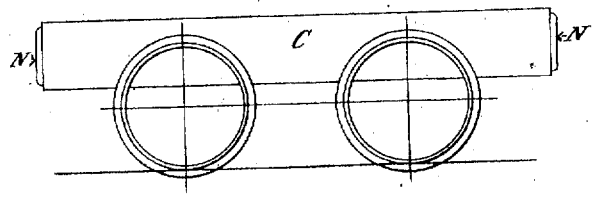
Figure 7:
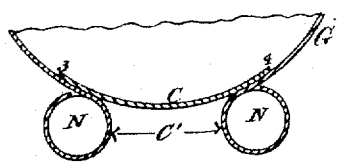
Figure 8:
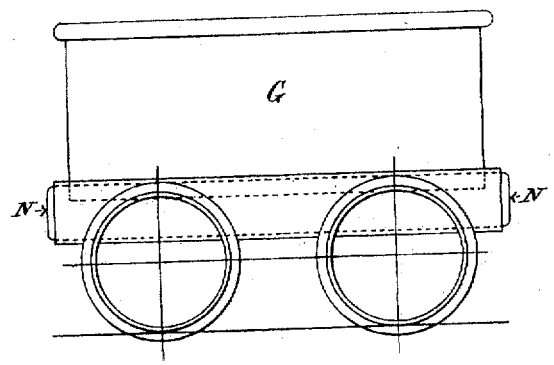
Figure 9:
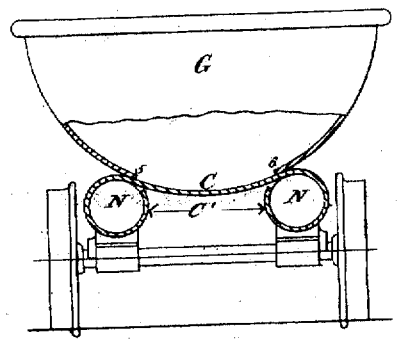

Fig. 5 is an end elevation of under work suitable for an ordinary metallic or composite wagon, and made of a plate or plates, C, as in Fig. 1. Fig. 6 is a side elevation of the same, the tubular sills being similarly furnished, as may be desired, with any of the buffers, as previously described. Fig. 7 is a part view, in vertical section, of a metallic wagon-body, in which the sides form the tubular sills for the reception of buffers, as above referred to. The bottom part, C, is formed of a metallic plate joined to the tubular parts of the under work at 3 and 4. Fig. 8 is a side elevation of Fig. 7. Fig. 9 is an end elevation of a metallic wagon, in which the tubular sills of the under work are formed with the bottom plate, C, so as to receive the buffers, as previously described with reference to Figs. 1 to 11, inclusive. In this case the side plates of the body G are joined to the bottom C at 5 and 6. The said sides G may be continued across between the tubular sills, or a separate plate be inserted between the termination of the sides G at 5 and 6, so as to form a double bottom, such part being usually the first to wear away. The use of said separate plate offers facilities for easy repairs.

What I claim is—

1. A wagon comprising, in combination with a wagon-body and standards at each end thereof, three recesses or bearings, the two outside ones being in a lower horizontal plane than the center one, and three studs, trunnions, or projections, whereby two tilted positions of the wagon-body, in addition to the normal vertical one, may be effected, substantially as set forth.

2. A wagon comprising, in combination with a wagon-body and standards at each end thereof, three recesses or bearings, three studs, trunnions, or projections, and stop projections engaging with the wagon-truck, substantially as set forth.

3. A wagon comprising, in combination with a wagon-body and standards at each end thereof, three recesses or bearings, three studs, trunnions, or projections, and a lower projecting part or keel adapted to engage in a locking device, substantially as set forth.

4. The combination of the wagon-body B, provided with studs or trunnions H I I', bottom projections, G², and stop projections L L', the standards D D, provided with the bearings E F F', the locking device G', and the truck C, substantially as set forth.

5. In a wagon, an under frame constructed of metallic plate with tubular chambers, substantially as described.

6. In a wagon, an under frame constructed of metallic plate with tubular chambers, in combination with buffers inserted in said tubular chambers, substantially as hereinbefore described and shown.

7. The improved tipping wagon comprising the under frame, C, with tubular chambers C', buffers N M O, standards D D', with recesses or bearings E F F', and body G, with studs, pins, or projections H I I', the whole constructed, arranged, and operating as and for the purposes hereinbefore described.

ROBERT HUDSON.

Witnesses:
   THOS. E. CRAVEN,
   C. E. FELL,
Inst. Patent Agents, 24 Victoria Chambers, Leeds.
   HENRY S. LENTY,
Clerk to Messrs. Teale & Appleton, Solicitors, Leeds.